April 19, 1927.
C. C. JENSEN
1,625,612
FASTENING DEVICE
Filed April 5, 1926
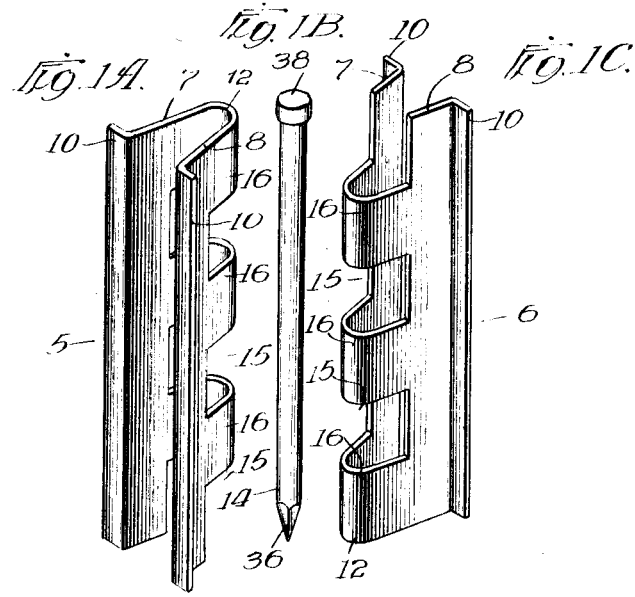
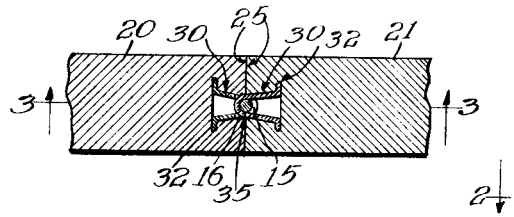
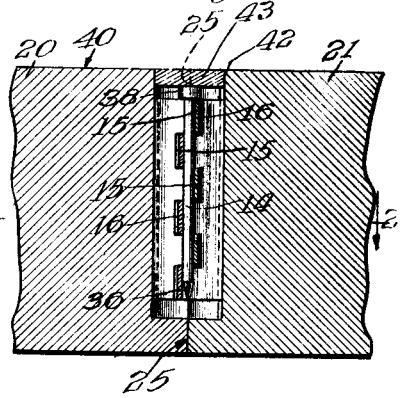
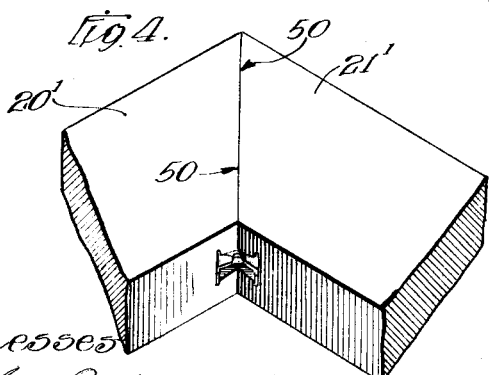
Witnesses
William P. Kilroy
Harry R. White
Inventor
Carl C. Jensen.
Brown Boettcher Dienner
By
Attys Patented Apr. 19, 1927.

1,625,612

UNITED STATES PATENT OFFICE.

CARL C. JENSEN, OF CHICAGO, ILLINOIS.

FASTENING DEVICE.

Application filed April 5, 1926. Serial No. 99,785.

This invention relates to fastening devices and more particularly to fastening devices having particular utility in joining the corners, meeting ends or other parts of wood structures and the like, although it is to be understood that the invention is not limited to a particular use or purpose, but may be employed wherever found desirable.

It is advantageous in the wood working industry and particularly in the construction of furniture and the interior cabinet work and trim for buildings to make the construction so that it may be taken apart. This is commonly known as a knock-down construction. Where the parts are too large or the pieces too long for convenient transportation, constructions of this sort permits taking the parts or pieces apart at the shop and setting them up at the place of installation.

My present invention contemplates an improved fastening device of novel, simple and inexpensive construction which will bind the members or parts joined thereby, fast, securely and neatly together and which will, at the same time, permit knocking down or taking the parts or members joined thereby apart with ease and convenience. The fastening device which I provide permits easy assembly and disjointing or connecting of the parts. Its cost is no higher than the ordinary fasteners heretofore provided for permanently joining the parts, and it is permanent and economical in use.

To acquaint those skilled in the art with the construction and manner of practicing the invention, I shall now describe a particular embodiment of the invention in connection with the accompanying drawings in which—

Figs. 1A, 1B and 1C are parts of a perspective view showing the two parts of the fastening device and the connecting pin in separated position;

Fig. 2 is a section on the line 2—2 of Fig. 3;

Fig. 3 is a section on the line 3—3 of Fig. 2; and

Fig. 4 is a fragmentary perspective view showing two corner pieces joined together with a device embodying the present invention.

Referring to the drawings, the fastening device shown comprises a pair of generally channel or V-shaped members 5 and 6. Each of the members 5 and 6 has sides 7 and 8 which spread or diverge outwardly and the free or marginal edges of the sides 7 and 8 are preferably turned outwardly or flanged at 10.

The bases 12 of the fastener members 5 and 6 may be rounded to conform generally to the periphery of the connecting pin 14 and punched or otherwise formed in the bases 12 and adjacent portions of the sides 7 and 8 are openings 15 which form connecting straps 16 alternately disposed with respect to the openings 15 and separated thereby.

The straps 16 are preferably of substantially the same width or slightly narrower than the openings 15 and the straps on one fastener member 5 are staggered with respect to the straps on the other fastener member 6, so that the straps 16 of one member will fit into the openings 15 of the other member and interlock the straps of one member with those of the other member when the two fastener members are assembled and connected. For example, where one fastener member 15 has a strap 16 at the top thereof and an opening 15 at the bottom, the other fastener member 6 will have an opening 15 at the top and a strap 16 at the bottom with the straps and openings staggered and alternately disposed therebetween, as shown.

The fastener members 5 and 6 are preferably formed of sheet metal of suitable gage. The strips of which these members are formed may be originally flat and these strips may be cut to lengths and the flanges 10 formed thereon by the first operation. Then, by means of a punch press and suitable dies, for example, the generally channel or V-shape may be formed and the holes 15 punched by the next or second operation.

The members 20 and 21 of Figs. 2 and 3 are shown as the parts of a straight or butt joint. The parts 20 and 21 of Figs. 2 and 3 are shown as arranged parallel to each other, but it is to be understood that the particular angle of the joint is immaterial.

In forming the joint the edges 25 of the boards or pieces 20 and 21 may be dressed to the proper angle, that is, at substantially right angles to the sides in this embodiment and dove-tail mortises 30 are then cut or otherwise formed in the abutting edges 25. The mortises 30 may be formed with the usual or standard dove-tailing tool now in use. The sides of the mortises 30 spread or converge inwardly, as shown, and the lead of the standard dove-tailing tool forms grooves 32 along the inner edges of the sides of the mortise. As in my prior Patent No. 1,537,678 of May 12, 1925, I preferably utilize these grooves 32 in joining the parts 20 and 21 together.

The generally channel or V-shaped fastener members 5 and 6 form dove-tail tenons, which tenons are adapted to be inserted endwise into the mortises 30 and fit snugly therein, one in each of the pieces 20 and 21. The flanges 10 engage in the grooves 32 when the fastener parts are inserted in the mortises of the parts to be joined thereby and bind the fastener parts firmly therein. The straps 16 of each fastener member 5 and 6 extend from the edges 25 and upon assembly these projecting straps overlap, as shown in Figs. 2 and 3, with the projecting parts of each set of straps extending into the mortise of the other part joined thereby and forming a socket 35 (Fig. 2) into which the pin 14 is inserted to join the parts firmly and securely together and, at the same time, permitting ready disjointing or knocking down of the same.

The pin 14 may be tapered at 36 and headed at 38, and it may be driven into place with its tapered end first. As it is inserted, it draws the parts 20 and 21 up tightly and securely together, and by cooperation with the overlapping straps of the two fastener pieces, joins the parts securely together. To disjoint the parts, all that is necessary is to remove the pin 14 which may always be conveniently done, for example, by grasping the head thereof with a suitable tool and pulling the pin out.

In use the interlocking of the straps or knuckles 16 positions them to receive the connecting pin 14 and the interlocking engagement of the knuckles holds the two parts of the fastener firmly against relative displacement along the pin 14. The end of the pin may be tapered to facilitate insertion and such a taper may be utilized to draw the fastener parts and the boards or other parts joined thereby together upon insertion of the pin. Any such drawing action may of course be omitted or employed as desired.

Where it is desirable to finish the edges 40 (Fig. 3) of the pieces 20 and 21 from which edges the fastening device is inserted, the outer end of the fastening device may be spaced inwardly from said edges when completely inserted, as shown at 42 in Fig. 3. A suitable plug 43 of a material corresponding, for example, to that of the pieces 20 and 21, may be then inserted to cover the outer end of the joint, and this plug may be removed in disconnecting or disjointing the parts.

In Fig. 4 I have shown a miter joint embodying the present invention. In this case, the abutting ends 50, of the members 20' and 21' are mitered, but the fastening device and manner of connecting and disconnecting is substantially as in the previous embodiment.

I do not intend to be limited to the precise details shown or described.

I claim:—

1. In combination with a pair of members to be joined, said members having mortises in their meeting ends of a fastening device comprising a pair of fastening elements, one fixedly secured in each mortise, said fastening elements having interlocking knuckles concealed within the members to be joined and a pin inserted through said interlocking knuckles to join said members and removable from said knuckles without relative movement between said members, said pin and knuckles co-operating to hold said members against relative movement without additional connections.

2. The combination with a pair of members to be joined, of a fastening device concealed within said members and comprising a pair of fastening elements one secured in each of said members, said fastening elements having interlocking knuckles concealed within said members and a pin inserted through said interlocking knuckles for rigidly joining said members with their meeting ends in abutting engagement and without relative movement between the members, said pin being also concealed within said members.

3. The combination with a pair of members to be joined, of a fastening device concealed within said members and comprising a pair of generally V-shaped fastening elements one secured in each of said members, said fastening elements having tapered interlocking knuckles formed by the bases of the V-shaped fastening elements, said knuckles being concealed within said members and having diverging sides secured in dove-tail mortises in the meeting ends of the members to be joined and a pin inserted into said interlocking knuckles for joining said members with their meeting ends in abutting engagement and without relative movement between the members, said pin being also concealed within said members.

4. In combination with a pair of members to be joined, said members having mortises in their meeting ends of a fastening device comprising a pair of fastening elements, one fixedly secured in each mortise, said fastening elements having interlocking knuckles concealed within the members to be joined and a pin inserted through said interlocking knuckles to join said members and removable from said knuckles without relative movement between said members, said pin and knuckles co-operating to hold said members against relative movement without additional connections, the mortises and fastening elements being of dove-tail formation with the knuckles closely embracing the pin and the fastening elements provided with out-turned margins and the pin being operable upon insertion into said knuckles to draw the meeting ends of the members together to form a tight joint therebetween.

In witness whereof, I hereunto subscribe my name this 29 day of March, 1926.

CARL C. JENSEN.